US012665301B2

(12) United States Patent
Zhao et al.

(10) Patent No.: US 12,665,301 B2
(45) Date of Patent: Jun. 23, 2026

(54) ANTENNA STRUCTURE

(71) Applicant: Quanta Computer Inc., Taoyuan City (TW)

(72) Inventors: Yu-Chen Zhao, Taoyuan City (TW); Chung-Ting Hung, Taoyuan City (TW); Chin-Lung Tsai, Taoyuan City (TW); Yi-Ling Tseng, Taoyuan City (TW); Kai-Hsiang Chang, Taoyuan City (TW); Chun-I Cheng, Taoyuan City (TW)

(73) Assignee: QUANTA COMPUTER INC., Taoyuan City (TW)

( * ) Notice: Subject to any disclaimer, the term of this patent is extended or adjusted under 35 U.S.C. 154(b) by 113 days.

(21) Appl. No.: 18/410,057

(22) Filed: Jan. 11, 2024

(65) Prior Publication Data

US 2025/0174900 A1 May 29, 2025

(30) Foreign Application Priority Data

Nov. 29, 2023 (TW) ................................ 112213015

(51) Int. Cl.
*H01Q 1/38* (2006.01)
*H01Q 1/50* (2006.01)
*H01Q 7/00* (2006.01)

(52) U.S. Cl.
CPC ................. *H01Q 7/00* (2013.01); *H01Q 1/38* (2013.01); *H01Q 1/50* (2013.01)

(58) Field of Classification Search
CPC ............... H01Q 7/00; H01Q 1/38; H01Q 1/50
See application file for complete search history.

(56) References Cited

U.S. PATENT DOCUMENTS 7,336,229 B1 * 2/2008 Tseng ..................... H01Q 5/378 343/702
7,872,605 B2 * 1/2011 Baliarda ................ H01Q 13/10 343/846

(Continued)

FOREIGN PATENT DOCUMENTS

CN 103178338 A * 6/2013
CN 116259953 A * 6/2023 ............... H01Q 1/48

(Continued)

*Primary Examiner* — Dimary S Lopez Cruz
*Assistant Examiner* — Bamidele A Immanuel
(74) *Attorney, Agent, or Firm* — McClure, Qualey & Rodack, LLP

(57) ABSTRACT

An antenna structure includes a feeding radiation element, a first grounding radiation element, a second grounding radiation element, a connection radiation element, an extension radiation element, and a dielectric substrate. The feeding radiation element has a feeding point. The first grounding radiation element has a first grounding point. The first grounding radiation element is adjacent to the feeding radiation element. The second grounding radiation element has a second grounding point. The connection radiation element is coupled between the first grounding radiation element and the second grounding radiation element. The extension radiation element is coupled to the connection radiation element. A closed slot is surrounded by the connection radiation element and the extension radiation element. The feeding radiation element, the first grounding radiation element, the second grounding radiation element, the connection radiation element, and the extension radiation element are all disposed on the dielectric substrate.

12 Claims, 3 Drawing Sheets

(56) References Cited

U.S. PATENT DOCUMENTS 8,618,993 B2 * 12/2013 Yun .................... H01Q 1/2208 343/866
8,866,683 B2 * 10/2014 Wong .................... H01Q 9/42 343/745
9,660,329 B2 * 5/2017 Lin .................... H01Q 1/36
10,411,333 B1 * 9/2019 Chang .................... G06F 1/1698
11,437,730 B2 * 9/2022 Hung .................... H01Q 9/30
2003/0122718 A1 * 7/2003 Fang .................... H01Q 5/378 343/702
2005/0153756 A1 * 7/2005 Sato .................... H01Q 5/371 455/575.1
2006/0152419 A1 * 7/2006 Sato .................... H01Q 9/42 343/702
2007/0030200 A1 * 2/2007 Heng .................... H01Q 19/28 343/702
2007/0285321 A1 * 12/2007 Chung .................... H01Q 5/371 343/702
2008/0169981 A1 * 7/2008 Hotta .................... H01Q 5/378 343/700 MS
2008/0180333 A1 * 7/2008 Martiskainen .................... H01Q 1/38 343/722
2008/0266190 A1 * 10/2008 Ohba .................... H01Q 5/385 343/702
2009/0073058 A1 * 3/2009 Lin .................... H01Q 1/526 343/702
2009/0079639 A1 * 3/2009 Hotta .................... H01Q 5/378 343/702
2009/0237308 A1 * 9/2009 Tsai .................... H01Q 5/378 343/700 MS
2009/0243935 A1 * 10/2009 Huang .................... H01Q 9/40 343/700 MS
2009/0243938 A1 * 10/2009 Tsai .................... H01Q 1/243 343/700 MS
2010/0079350 A1 * 4/2010 Lai .................... H01Q 19/32 343/893
2010/0309067 A1 * 12/2010 Tsou .................... H01Q 3/26 343/726
2011/0032165 A1 * 2/2011 Heng .................... H01Q 5/378 343/745
2011/0084883 A1 * 4/2011 Wong .................... H01Q 9/0471 343/702
2011/0163937 A1 * 7/2011 Jung .................... H01Q 1/243 343/893
2011/0254737 A1 * 10/2011 Chiu .................... H01Q 9/42 343/700 MS
2012/0001815 A1 * 1/2012 Wong .................... H01Q 9/0421 343/843
2012/0081261 A1 * 4/2012 Huang .................... H01Q 21/28 343/866
2012/0087506 A1 * 4/2012 Ozden .................... H01Q 9/42 455/90.3
2012/0200461 A1 * 8/2012 Lee .................... H01Q 9/42 343/700 MS
2012/0235866 A1 * 9/2012 Kim .................... H01Q 7/00 343/700 MS
2012/0249393 A1 * 10/2012 Hotta .................... H01Q 7/00 343/843
2012/0280890 A1 * 11/2012 Kusumoto .................... H01Q 5/40 343/906
2013/0271942 A1 * 10/2013 Kim .................... H05K 1/0218 361/816
2013/0300626 A1 * 11/2013 Lee .................... H01Q 1/243 343/850
2014/0145892 A1 * 5/2014 Tseng .................... H01Q 9/0421 343/750
2014/0253398 A1 * 9/2014 Hsieh .................... H01Q 5/371 343/745
2014/0361948 A1 * 12/2014 Tanaka .................... H01Q 1/243 343/861
2015/0097753 A1 * 4/2015 Liou .................... H01Q 7/00 343/867
2015/0155613 A1 * 6/2015 Hotta .................... H01Q 13/16 343/702
2015/0162660 A1 * 6/2015 Orsi .................... H01Q 9/42 343/866
2015/0280319 A1 * 10/2015 Yeh .................... H01Q 5/321 343/749
2015/0303551 A1 * 10/2015 Su .................... H01Q 1/243 343/702
2016/0043467 A1 * 2/2016 Desclos .................... H01Q 9/42 343/745
2016/0156102 A1 * 6/2016 Azad .................... H01Q 9/42 343/905
2016/0218421 A1 * 7/2016 Lin .................... H01Q 1/50
2016/0254832 A1 * 9/2016 Yoo .................... H01Q 13/10 455/575.5
2017/0104261 A1 * 4/2017 Wong .................... H01Q 5/335
2017/0133759 A1 * 5/2017 Singh .................... H01Q 3/2611
2017/0162941 A1 * 6/2017 Krogerus .................... H01Q 7/00
2017/0187113 A1 * 6/2017 Svendsen .................... H01Q 9/42
2017/0264975 A1 * 9/2017 Wong .................... H01Q 5/385
2018/0062243 A1 * 3/2018 Yang .................... H01Q 1/2291
2018/0090840 A1 * 3/2018 Yu .................... H01Q 21/064
2018/0090850 A1 * 3/2018 Lee .................... H01Q 21/30
2018/0183135 A1 * 6/2018 Suzuki .................... H01Q 1/242
2018/0226717 A1 * 8/2018 Desclos .................... H01Q 5/385
2018/0278287 A1 * 9/2018 Nishikawa .................... H04B 1/3838
2018/0287268 A1 * 10/2018 Kosaka .................... H01Q 13/10
2018/0342794 A1 * 11/2018 Han .................... H04B 1/18
2019/0181549 A1 * 6/2019 Hsieh .................... H01Q 1/38
2019/0198975 A1 * 6/2019 Chen .................... H01Q 9/42
2020/0168992 A1 * 5/2020 Peng .................... H01Q 5/45
2021/0013620 A1 * 1/2021 Hung .................... H01Q 9/0457
2021/0057819 A1 * 2/2021 Yoo .................... G04G 17/02
2021/0066801 A1 * 3/2021 Tsai .................... H01Q 9/42
2021/0336327 A1 * 10/2021 Kim .................... H01Q 1/24
2022/0271429 A1 * 8/2022 Kosaka .................... H01Q 1/38
2022/0320740 A1 * 10/2022 Chang .................... H01Q 5/364
2022/0407217 A1 * 12/2022 Wang .................... H01Q 1/243
2023/0216173 A1 * 7/2023 Chang .................... H01Q 1/42 343/702

FOREIGN PATENT DOCUMENTS

JP 4121799 B2 * 7/2008
JP 5603020 B2 * 10/2014
JP 2019047183 A * 3/2019
JP 7616231 B2 * 1/2025 .................... H01Q 5/328
TW 1736387 B * 8/2021
WO WO-2018180875 A1 * 10/2018 .................... H01Q 21/24

* cited by examiner

ANTENNA STRUCTURE

CROSS REFERENCE TO RELATED APPLICATIONS

This application claims priority of Taiwan Patent Application No. 112213015 filed on Nov. 29, 2023, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHZ, 850 MHz, 900 MHz, 1800 MHZ, 1900 MHZ, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has an insufficient operational bandwidth, it may degrade the communication quality of the relative mobile device. Accordingly, it has become a critical challenge for designers to design a small-size, wideband antenna structure.

BRIEF SUMMARY OF THE INVENTION

In an exemplary embodiment, the invention is directed to an antenna structure that includes a feeding radiation element, a first grounding radiation element, a second grounding radiation element, a connection radiation element, an extension radiation element, and a dielectric substrate. The feeding radiation element has a feeding point. The first grounding radiation element has a first grounding point. The first grounding radiation element is adjacent to the feeding radiation element. The second grounding radiation element has a second grounding point. The connection radiation element is coupled between the first grounding radiation element and the second grounding radiation element. The extension radiation element is coupled to the connection radiation element. A closed slot is surrounded by the connection radiation element and the extension radiation element. The feeding radiation element, the first grounding radiation element, the second grounding radiation element, the connection radiation element, and the extension radiation element are all disposed on the dielectric substrate.

In some embodiments, the notch region is defined by the first grounding radiation element, the connection radiation element, and the second grounding radiation element.

In some embodiments, the feeding radiation element substantially has an L-shape and extends into the notch region.

In some embodiments, the first loop path is formed by the first grounding radiation element, the extension radiation element, and the second grounding radiation element.

In some embodiments, the second loop path is formed by the first grounding radiation element, the connection radiation element, and the second grounding radiation element.

In some embodiments, the length of the first loop path is greater than the length of the second loop path.

In some embodiments, the antenna structure covers a first frequency band and a second frequency band. The first frequency band is from 700 MHz to 800 MHz. The second frequency band is from 1710 MHz to 2170 MHz.

In some embodiments, the length of the first loop path is substantially equal to 0.5 wavelength of the first frequency band.

In some embodiments, the length of the second loop path is substantially equal to 0.5 wavelength of the second frequency band.

In some embodiments, the length of the feeding radiation element is substantially equal to 0.25 wavelength of the second frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
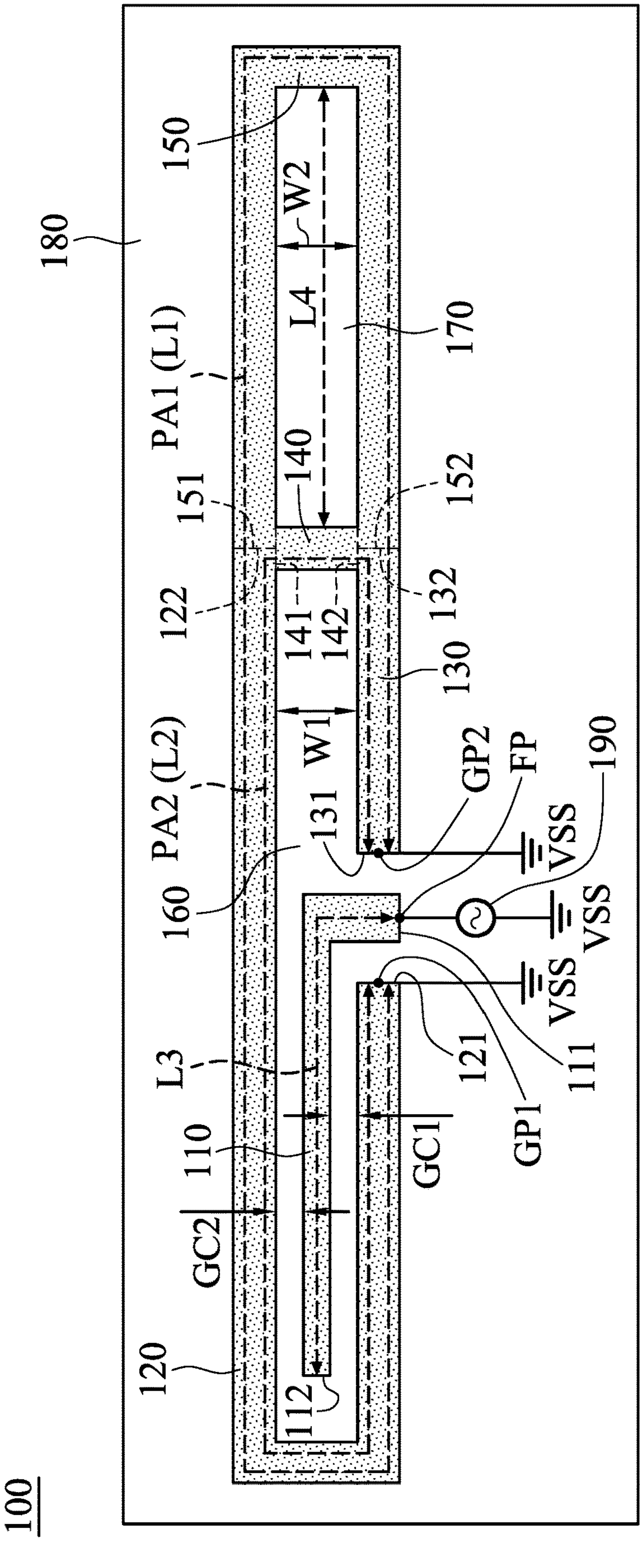
FIG. 1 is a diagram of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an antenna structure 100 according to an embodiment of the invention. The antenna structure 100 may be applied to a mobile device, such as a smart phone, a tablet computer, a notebook computer, a wireless access point, a router, or any device with a communication function. Alternatively, the antenna structure 100 may be applied to an electronic device, such as any unit of IoT (Internet of Things).

In the embodiment of FIG. 1, the antenna structure 100 includes a feeding radiation element 110, a first grounding radiation element 120, a second grounding radiation element 130, a connection radiation element 140, an extension radiation element 150, and a dielectric substrate 180. The feeding radiation element 110, the first grounding radiation element 120, the second grounding radiation element 130, the connection radiation element 140, and the extension radiation element 150 may all be made of metal materials, such as copper, silver, aluminum, iron, or their alloys.

The feeding radiation element 110 may substantially have an L-shape. Specifically, the feeding radiation element 110 has a first end 111 and a second end 112. A feeding point FP is positioned at the first end 111 of the feeding radiation element 110. The second end 112 of the feeding radiation element 110 is an open end. The feeding point FP may be further coupled to a signal source 190. For example, the signal source 190 may be an RF (Radio Frequency) module for exciting the antenna structure 100. In some embodiments, the notch region 160 is defined by the first grounding radiation element 120, the connection radiation element 140, and the second grounding radiation element 130. The feeding radiation element 110 can extend into the notch region 160. For example, the notch region 160 may substantially have a relatively large rectangular shape, but it is not limited thereto.

The first grounding radiation element 120 may have a meandering shape. For example, the first grounding radiation element 120 may substantially have an inverted J-shape, but it is not limited thereto. Specifically, the first grounding radiation element 120 has a first end 121 and a second end 122. A first grounding point GP1 is positioned at the first end 121 of the first grounding radiation element 120. The first grounding point GP1 may be further coupled to a ground voltage VSS. The ground voltage VSS may be provided by a system ground plane (not shown) of the antenna structure 100. In some embodiments, the first grounding radiation element 120 is adjacent to the feeding radiation element 110, so that a first coupling gap GC1 and a second coupling gap GC2 can be formed between the first grounding radiation element 120 and the feeding radiation element 110. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

The second grounding radiation element 130 may have a relatively long straight-line shape. Specifically, the second grounding radiation element 130 has a first end 131 and a second end 132. A second grounding point GP2 is positioned at the first end 131 of the second grounding radiation element 130. The second grounding point GP2 may be further coupled to the ground voltage VSS. In some embodiments, the first grounding point GP1, the feeding point FP, and the second grounding point GP2 are substantially arranged in the same straight line. The feeding point FP may be positioned between the first grounding point GP1 and the second grounding point GP2. In addition, both the first grounding point GP1 and the second grounding point GP2 may be adjacent to the feeding point FP.

The connection radiation element 140 may substantially have a relatively short straight-line shape (compared with the second grounding radiation element 130). Specifically, the connection radiation element 140 has a first end 141 and a second end 142. The first end 141 of the connection radiation element 140 is coupled to the second end 122 of the first grounding radiation element 120. The second end 142 of the connection radiation element 140 is coupled to the second end 132 of the second grounding radiation element 130. That is, the connection radiation element 140 is coupled between the first grounding radiation element 120 and the second grounding radiation element 130.

The extension radiation element 150 may substantially have a U-shape. Specifically, the extension radiation element 150 has a first end 151 and a second end 152. The first end 151 of the extension radiation element 150 is coupled to the second end 122 of the first grounding radiation element 120 and the first end 141 of the connection radiation element 140. The second end 152 of the extension radiation element 150 is coupled to the second end 132 of the second grounding radiation element 130 and the second end 142 of the connection radiation element 140. It should be noted that a closed slot 170 is surrounded by the connection radiation element 140 and the extension radiation element 150. For example, the closed slot 170 may substantially have a relatively small rectangular shape (compared with the notch region 160 as mentioned above), but it is not limited thereto.

In some embodiments, a first loop path PA1 can be formed by the first grounding radiation element 120, the extension radiation element 150, and the second grounding radiation element 130. Furthermore, a second loop path PA2 can be formed by the first grounding radiation element 120, the connection radiation element 140, and the second grounding radiation element 130. The length L1 of the first loop path PA1 may be greater than the length L2 of the second loop path PA2. It should be understood that each loop path may not be completely closed, which may still have a small notch. For example, the small notch may be positioned around the feeding point FP, but it is not limited thereto. The feeding radiation element 110, the first grounding radiation element 120, the second grounding radiation element 130, the connection radiation element 140, and the extension radiation element 150 may all be disposed on the same surface of the dielectric substrate 180. The shape and type of the dielectric substrate 180 are not limited in the invention. For example, the dielectric substrate 180 may be an FR4 (Flame Retardant 4) substrate, a PCB (Printed Circuit Board), or an FPC (Flexible Printed Circuit). In some embodiments, the antenna structure 100 is a planar antenna structure. However, in alternative embodiments, the antenna structure 100 is modified to a 3D (Three-Dimensional) antenna structure.

Figure 2:
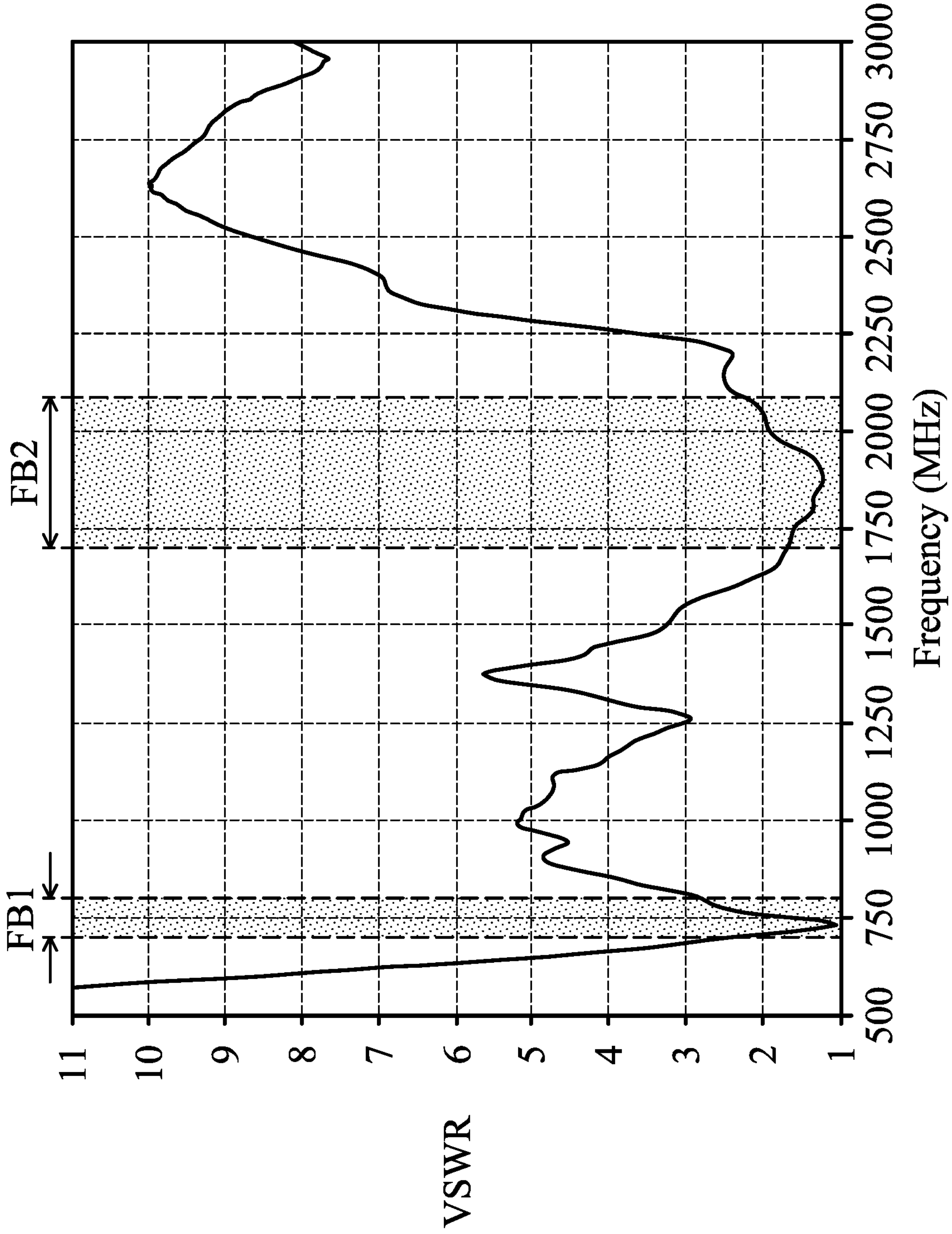
FIG. 2 is a diagram of VSWR (Voltage Standing Wave Ratio) of an antenna structure according to an embodiment of the invention.

FIG. 2 is a diagram of VSWR (Voltage Standing Wave Ratio) of the antenna structure 100 according to an embodiment of the invention. The horizontal axis represents the operational frequency (MHz), and the vertical axis represents the VSWR. According to the measurement of FIG. 2, the antenna structure 100 can cover a first frequency band FB1 and a second frequency band FB2. For example, the first frequency band FB1 may be from 700 MHz to 800 MHz, and the second frequency band FB2 may be from 1710 MHz to 2170 MHz. Therefore, the antenna structure 100 can support at least the wideband operations of LTE (Long Term Evolution).

The operational principles of the antenna structure 100 in some embodiments are as follows. The first loop path PA1 can be excited to generate a fundamental resonant mode, thereby forming the first frequency band FB1. The second loop path PA2 can be excited to generate the second frequency band FB2. The first loop path PA1 can also be excited to generate a higher-order resonant mode, thereby contributing to the second frequency band FB2. In addition, the feeding radiation element 110 can be configured to increase the operational bandwidth of the second frequency band FB2. According to practical measurements, such a dual-loop design can effectively prevent the radiation performance of the antenna structure 100 from being negatively affected by environmental noise.

The element sizes of the antenna structure 100 in some embodiments are as follows. The length L1 of the first loop path PA1 may be substantially equal to 0.5 wavelength (λ/2) of the first frequency band FB1 of the antenna structure 100. That is, the total length L1 of the first grounding radiation element 120, the extension radiation element 150, and the second grounding radiation element 130 may be substantially equal to 0.5 wavelength (λ/2) of the first frequency band FB1 of the antenna structure 100. The length L2 of the second loop path PA2 may be substantially equal to 0.5 wavelength (λ/2) of the second frequency band FB2 of the antenna structure 100. That is, the total length L2 of the first grounding radiation element 120, the connection radiation element 140, and the second grounding radiation element 130 may be substantially equal to 0.5 wavelength (λ/2) of the second frequency band FB2 of the antenna structure 100. The length L3 of the feeding radiation element 110 may be substantially equal to 0.25 wavelength (λ/4) of the second frequency band FB2 of the antenna structure 100. The width W1 of the notch region 160 may be from 2 mm to 4 mm, such as about 3 mm. The length L4 of the closed slot 170 may be from 27 mm to 33 mm, such as about 30 mm. The width W2 of the closed slot 170 may be from 2 mm to 4 mm, such as about 3 mm. The width of the first coupling gap GC1 may be smaller or equal to 1 mm. The width of the second coupling gap GC2 may be smaller or equal to 1 mm. The above ranges of element sizes are calculated and obtained according to many experimental results, and they help to optimize the operational bandwidth and the impedance matching of the antenna structure 100.

Figure 3:
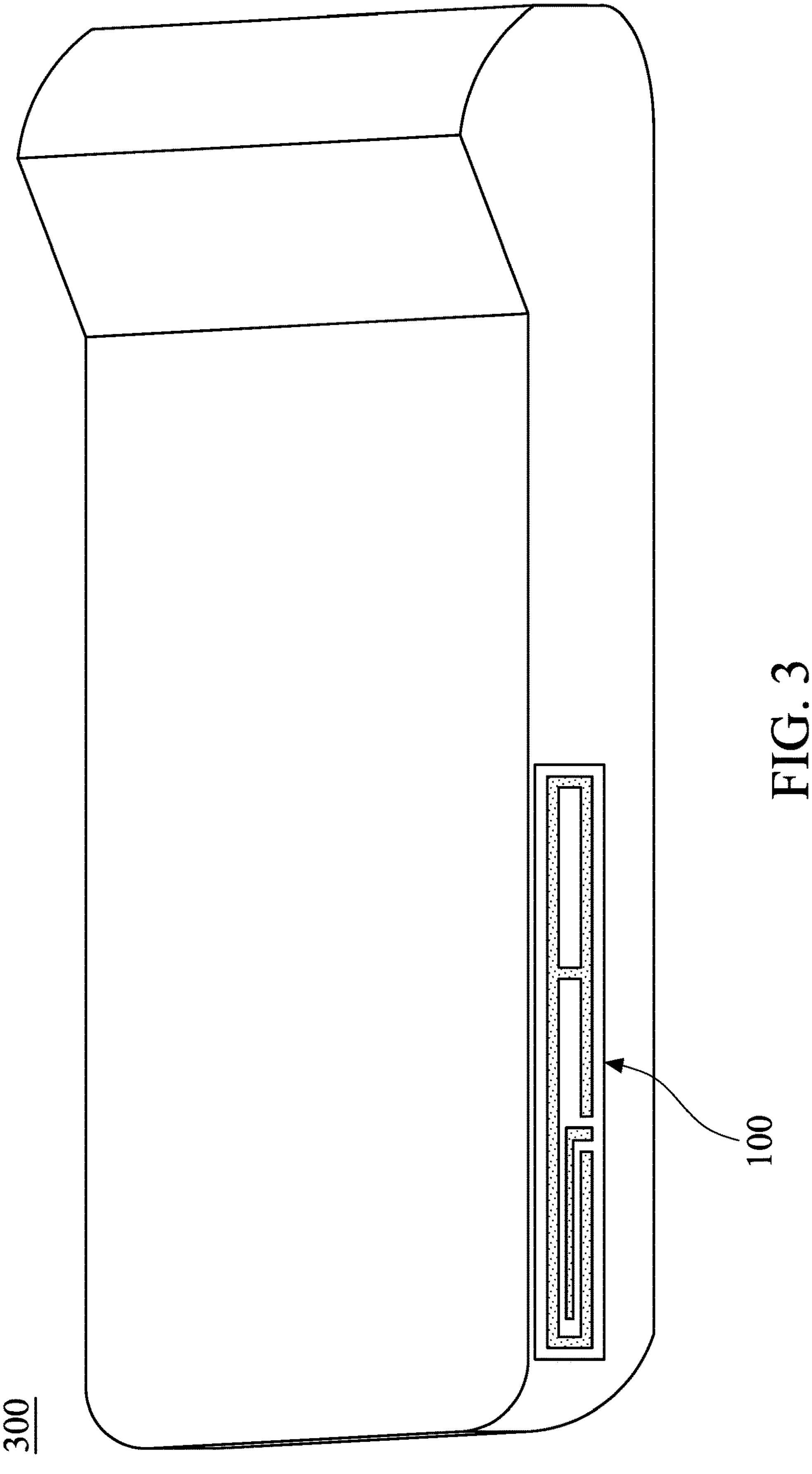
FIG. 3 is a diagram of a POS (Point of Sale) system according to an embodiment of the invention.

FIG. 3 is a diagram of a POS (Point of Sale) system 300 according to an embodiment of the invention. In the embodiment of FIG. 3, the POS system 300 includes the aforementioned antenna structure 100, and thus the POS system 300 supports the function of wireless communication. In some embodiments, the POS system 300 further includes an RF circuit, a filter, an amplifier, a processor, and/or a housing, but it is not limited thereto. It should be noted that the structural details of the antenna structure 100 can be slightly adjusted according to the style of the POS system 300, without affecting the communication quality thereof. Other features of the POS system 300 of FIG. 3 are similar to those of the antenna structure 100 of FIG. 1. Therefore, the two embodiments can achieve similar levels of performance.

The invention proposes a novel antenna structure. In comparison to the conventional design, the invention has at least the advantages of small size, wide bandwidth, suppressed noise interference, and low manufacturing cost. Therefore, the invention is suitable for application in a variety of mobile communication devices or the IoT.

Note that the above element sizes, element shapes, and frequency ranges are not limitations of the invention. An antenna designer can fine-tune these settings or values to meet different requirements. It should be understood that the antenna structure of the invention is not limited to the configurations of FIGS. 1 to 3. The invention may merely include any one or more features of any one or more embodiments of FIGS. 1 to 3. In other words, not all of the features displayed in the figures should be implemented in the antenna structure of the invention.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a feeding radiation element, having a feeding point;

a first grounding radiation element, having a first grounding point, wherein the first grounding radiation element is adjacent to the feeding radiation element;

a second grounding radiation element, having a second grounding point;

a connection radiation element, coupled between the first grounding radiation element and the second grounding radiation element;

an extension radiation element, coupled to the connection radiation element, wherein a closed slot is surrounded by the connection radiation element and the extension radiation element; and a dielectric substrate, wherein the feeding radiation element, the first grounding radiation element, the second grounding radiation element, the connection radiation element, and the extension radiation element are disposed on the dielectric substrate;

wherein a length of the closed slot is from 27 mm to 33 mm, and a width of the closed slot is from 2 mm to 4 mm;

wherein the first grounding radiation element is separate from the feeding radiation element.

2. The antenna structure as claimed in claim 1, wherein a notch region is defined by the first grounding radiation element, the connection radiation element, and the second grounding radiation element.

3. The antenna structure as claimed in claim 2, wherein the feeding radiation element substantially has an L-shape and extends into the notch region.

4. The antenna structure as claimed in claim 1, wherein a first loop path is formed by the first grounding radiation element, the extension radiation element, and the second grounding radiation element.

5. The antenna structure as claimed in claim 4, wherein a second loop path is formed by the first grounding radiation element, the connection radiation element, and the second grounding radiation element.

6. The antenna structure as claimed in claim 5, wherein a length of the first loop path is greater than that of the second loop path.

7. The antenna structure as claimed in claim 5, wherein the antenna structure covers a first frequency band and a second frequency band, the first frequency band is from 700 MHz to 800 MHz, and the second frequency band is from 1710 MHz to 2170 MHz.

8. The antenna structure as claimed in claim 7, wherein a length of the first loop path is substantially equal to 0.5 wavelength of the first frequency band.

9. The antenna structure as claimed in claim 7, wherein a length of the second loop path is substantially equal to 0.5 wavelength of the second frequency band.

10. The antenna structure as claimed in claim 7, wherein a length of the feeding radiation element is substantially equal to 0.25 wavelength of the second frequency band.

11. The antenna structure as claimed in claim 1, wherein the first grounding radiation element substantially has an inverted J-shape.

12. The antenna structure as claimed in claim 11, wherein the feeding radiation element has an open end surrounded by the first grounding radiation element.

* * * * *